Jan. 12, 1954  A. T. DUDLEY  2,665,540
LAWN EDGE TRIMMER
Filed May 31, 1950
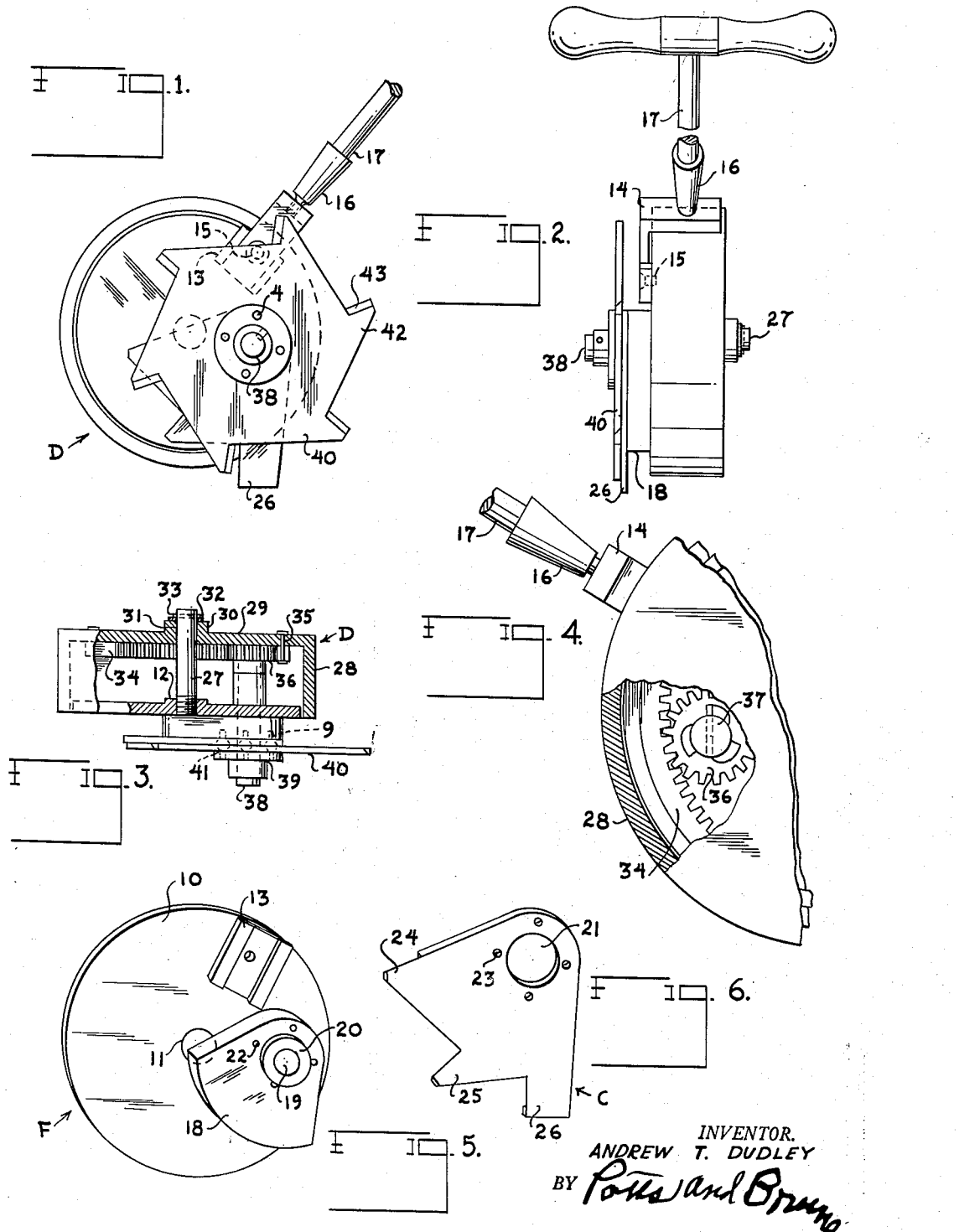
INVENTOR.
ANDREW T. DUDLEY
BY Potts and Bruno
His Attorney

UNITED STATES PATENT OFFICE 2,665,540

LAWN EDGE TRIMMER

Andrew T. Dudley, Port Arthur, Tex.

Application May 31, 1950, Serial No. 165,341

1 Claim. (Cl. 56—256)

The present invention relates to a cutting device that is designed for trimming the edges of lawns and is concerned primarily with certain improvements which result in neatly trimmed edges.

A lawn trimmer of the character with which the present invention is concerned includes, as an essential element, a frame which carries an axle on which a drive wheel is rotatably mounted. Extending upwardly at an appropriate angle from the frame is a handle that adapts the device for manual operation. Journalled in the frame is a drive shaft which is connected through appropriate gearing to the drive wheel and which carries at its outer free end a cutter wheel. A fixed cutter is also secured to the frame in position for cooperation with the cutting wheel.

An important object of the invention is to provide, in a lawn trimmer of the character described, a pinion which is mounted on the drive shaft by one-way clutch mechanism whereby the driving relation between this pinion and the drive shaft is established for only one direction of rotation. In the opposite direction the pinion rotates freely with respect to the drive shaft. This pinion meshes with an internal ring gear carried by the drive wheel and establishes the drive to the drive shaft. With this arrangement the lawn trimmer may be moved in one direction to rotate the cutter wheel while movement in the opposite direction is permitted without being accompanied by any rotation of the cutter wheel.

Another highly important object of the present invention is to provide, in a lawn trimmer of the type indicated, a fixed cutter which includes three shear blades or cutting elements located at different levels. These shear blades are adapted to cooperate with the shear elements on the cutting wheel, and their location at the three levels assures of a complete and efficient cutting of the grass along the edges of the lawn.

Still another object is to provide, in a lawn trimmer of the character noted, a fixed cutter which includes a portion that projects below the lowermost point of the cutting wheel. This portion serves as a guide such as may extend down below the edge of a concrete walk or similar structure usually found along the edge of a lawn.

Yet another object of the invention is to provide, in a lawn trimmer of the type aforesaid, a cutting wheel that is drivably mounted on the drive shaft and which is formed with a plurality of cutting elements which are so spaced about the periphery of the cutting wheel that only one of them is in effective engagement with one of the shear elements on the fixed cutter at one time. With this arrangement definite assurance is had that the lawn trimmer will, at any one time, be subjected only to the load of a single cutting operation.

A further object of the invention is to provide, in a lawn cutter of the type noted, a cutting wheel having cutting elements which are slightly greater in extent than at least two of the shear elements on the fixed cutter. This overlapping relation provides for drawing in of the grass on to these elements of the fixed cutter.

Another highly important object of the invention is to provide, in a lawn trimmer of the type indicated, a fixed cutter having shear elements, the cutting edges of which are angularly offset with respect to true radii, together with a cutting wheel having cutting elements the edges of which are radially disposed. This offset relation, coupled with the true radial position of the edges of the cutting elements of the cutting wheel, provides for a shearing action in the actual cutting operation.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a lawn trimmer including a frame carrying an axle on which a driving wheel is mounted, with the driving wheel carrying a ring gear that meshes with a pinion that is mounted through the medium of a one-way clutch on a drive shaft that is journalled in the frame. The frame carries a fixed cutter having three shear elements located at different levels, with the edges of the shear elements angularly offset with respect to radii from the axis of the drive shaft.

Drivably mounted on the drive shaft is a cutter wheel having a plurality of cutting elements greater in number than those on the fixed cutter and so arranged with respect thereto that only one cutting element of the cutting wheel engages a shear element of the fixed cutter at one time. The edges of the cutting elements on the cutting wheel are in alignment with the true radii of the axis of the drive shaft and they are longer than at least two of the shear elements of the fixed cutter.

The lowermost shear element of the fixed cutter is extended below the drive wheel to function as a guide.

For a full and a more complete understanding of the invention, reference may be had to the following description and accompanying drawing, wherein:

Figure 1 is a view in side elevation of a lawn trimmer designed in accordance with the precepts of this invention. In this view the handle is broken away.

Figure 2 is a view in end elevation of the lawn trimmer shown in Figure 1;

Figure 3 is a view looking from the top showing most of the frame and driving wheel in horizontal section;

Figure 4 is an enlarged detailed view taken from the side with parts broken away and shown in section of the driven wheel and brings out the one-way clutch which is interposed between the pinion and the driven shaft;

Figure 5 is an enlarged detailed perspective of the frame per se; and

Figure 6 is an enlarged detailed perspective of the fixed cutter.

Referring now to the drawing, wherein like characters of reference indicate corresponding parts and, first, more particularly to Figure 5, the lawn trimmer of this invention is shown as including a frame which is referred to in its entirety by the reference character F. The frame F comprises a circular plate 10 which is formed with a central opening 11 which is threaded. The plate 10 is slightly thickened or embossed about the opening 11 on its inner face as shown at 12 in Figure 3. On its outer face the plate 10 carries a channel-shaped member 13 which is designed to receive one leg of an L-shaped bracket that is shown at 14 in Figure 2. A countersunk screw such as represented at 15 in Figure 2 may be employed to secure the bracket 14 in position. The bracket 14 carries a socket member 16 which receives a handle 17 in a well-known manner.

Included as a part of the frame F is a sector-like plate 18, and an opening 19 extends through the plate 10, the sector-like portion 18, and a ring-like embossment 20 that is disposed about the opening 19.

A fixed cutter is shown at Figure 6 and is referred to in its entirety by the reference character C. The fixed cutter C is formed with an opening at 21 which receives the ring-like embossment 20. The sector 18 is formed with a plurality of openings 22 and 22a, and the fixed cutter C is formed with a plurality of openings 23 and 23a which are similarly arranged so that they align with the openings 22 and 22a. Screw bolts represented at 9 in Figure 3 secure the fixed cutter C in position on the sector 18.

The fixed cutter C is provided with three shear elements designated 24, 25, and 26. Each of these cutting elements has a bevelled cutting edge which is angularly offset with respect to a radius taken from the axis of the opening 21. It will be noted that the lowermost cutting element 26 is longer than the cutting elements 24 and 25 for a purpose to be later described.

Secured in the opening 11 is an axle 27. Freely journalled on the axle 27 is a drive wheel which is referred to in its entirety by the reference character D. This drive wheel D includes a cylindrical wall 28 that is adapted to roll along the edge of a walk or pavement and which is integrally connected to a circular plate 29. The latter is formed with a central enlargement at 30 which is continued inwardly throughout the entire axial extent of the wheel D and an opening 31 extends through this enlargement and the plate 29. It is this opening 31 which receives the axle 27. A washer 32 and a cotter pin 33 secure the drive wheel D in position on the axle 27.

Mounted on the inner face of the circular plate 29 of the drive wheel D is an internal ring gear 34. This ring gear may be held in position on this inner face in any preferred manner such as by the screw bolts shown at 35.

Meshing with the ring gear 34 is a pinion 36 which is connected, through the medium of the one-way clutch mechanism shown at 37 in Figure 4, to a driven shaft 38. The one-way clutch 37 serves to establish the driving relation between the pinion 36 and the driven shaft 38 in one direction of rotation.

The driven shaft 38 is journalled in the opening 19 and extends beyond the outer face of the fixed cutter C. It carries a hub 39, and secured to this hub 39 is a cutting wheel 40. The cutting wheel 40 is secured to the hub 39 in any preferred manner, such as by the screw bolts represented at 41.

The cutting wheel 40 is provided with a plurality of cutting elements 42. The number of these cutting elements 42 should be in excess of the three shear elements on the fixed cutter C. In the form of the invention illustrated in the drawing, the cutting wheel 40 is shown as having six of the cutting elements 42. Each of these cutting elements 42 has an edge 43 that is disposed in alignment with a true radius taken from the axis of the driven shaft. Thus, these cutting edges 43 cooperate with the cutting edges of the elements 24, 25, and 26 of the fixed cutter with a shearing action.

While the cutting elements 42 are equi-angularly spaced about the cutting wheel 40, the elements 24, 25, and 26 are so arranged that only one of the cutting edges 43 is in engagement with any one of them at any one time. Thus, the machine is never subject to a load any greater than that of a single cutting operation.

As shown in Figure 1, the cutting element 26 extends below the lowermost periphery of the driving wheel D whereby it is adapted to function as a guide which will extend down along the edge of a concrete walk. It is also notable that the cutting edges 43 are slightly longer than the cutting edges of the members 24 and 25.

Operation

While the operation of the above described lawn trimmer is believed to be obvious from the description of the parts given, it may be briefly outlined by noting that the operator avails of the handle 17 in a well-known manner and pushes the drive wheel D along the surface at the edge of a lawn. During this operation the member 26 which projects below the edge of the walk will function as a guide. As the driving wheel D is rotated the ring gear 34 is correspondingly rotated and drives the pinion 36. The latter, through the medium of the one-way clutch 37 drives the driven shaft 38. Due to the gear ratio, the driven shaft 38 is rotated four times for every complete revolution of the drive wheel D. That is, the gear ratio is four to one. The cutter wheel 40 being drivably mounted on the driven shaft 38 is rotated so that the edges 43 of the cutting elements 42 are brought into successive cooperation with the cutting elements 24, 25, and 26. As above explained, only one cutting operation actually takes place at any one time. Due to the location of the cutting elements 24, 25, and 26 at different levels, the edge of the lawn is effectively trimmed as all the grass therealong will be cut. Each cutting operation takes place with a shearing action due to the angular disposition of the cutting edges of the elements 24, 25, and 26 and the latter will tend to draw grass down onto the cutting elements 24, 25, and 26.

While a preferred specific embodiment of the invention is hereinbefore set forth, it is to be clearly understood that the invention is not to be limited to the exact mechanisms, constructions and devices illustrated and described because various modifications of these details may be provided in putting the invention into practice within the purview of the appended claim.

What is claimed is:

In a lawn trimmer including a frame, a drive wheel rotatably mounted on said frame, a drive shaft journalled in said frame, and gear mechanism operatively connecting said drive wheel to said drive shaft and including a one-way clutch, the improvement consisting of: a fixed cutter on said frame having three cutting elements with cutting edges angularly offset with respect to radii of said drive shaft and with the lowermost cutting element longer than the other two and extending below the lowermost periphery of said drive wheel, and a cutting wheel carried by said drive shaft and having six cutting elements the cutting edges of which are in alignment with radii of said wheel and which have a radial extent greater than the two shorter elements of said fixed cutter, the cutting elements of said fixed cutter being spaced apart so that only one of them is in effective engagement with the cutting element of the cutting wheel at any one time, each of the cutting elements on the cutting wheel having an extent whereby it also extends below the lowermost periphery of said drive wheel when it engages said lowermost fixed cutter.

ANDREW T. DUDLEY.

References Cited in the file of this patent

UNITED STATES PATENTS

| Number | Name | Date |
| --- | --- | --- |
| 223,505 | Hanley | Jan. 13, 1880 |
| 536,497 | Warren | Mar. 26, 1895 |
| 856,940 | Cady | June 11, 1907 |
| 1,169,002 | Butler | Jan. 18, 1916 |
| 1,912,893 | Engel | June 6, 1933 |
| 1,970,827 | Van Kesteren | Aug. 21, 1934 |
| 2,512,132 | Ayers | June 20, 1950 |